United States Patent [19]

Dalibor

[11] Patent Number: 5,153,257

[45] Date of Patent: Oct. 6, 1992

[54] COPOLYMERIZATE SOLUTIONS BASED ON ADDITION PRODUCTS OF α,β-UNSATURATED CARBOXYLIC ACIDS WITH GLYCIDYL ESTERS AND OF α,β-UNSATURATED MONOMERS WHICH CAN BE COPOLYMERIZED WITH THEM

[75] Inventor: Horst Dalibor, late of Norderstedt, Fed. Rep. of Germany, by Walter Nielsch, Guardian

[73] Assignee: Synthopol Chemie Dr. Rer. Pol. Koch GmbH & Co., Buxtehude, Fed. Rep. of Germany

[21] Appl. No.: 642,962

[22] Filed: Jan. 18, 1991

[30] Foreign Application Priority Data

Jan. 20, 1990 [DE] Fed. Rep. of Germany ....... 4001579

[51] Int. Cl.$^5$ .......................... C08L 37/00; C08K 5/10; C08F 4/00
[52] U.S. Cl. .................................. 524/548; 524/284; 524/853; 526/89
[58] Field of Search .......................................... 524/548

[56] References Cited

U.S. PATENT DOCUMENTS 4,874,670  10/1989  Boon et al. ....................... 428/423.9

FOREIGN PATENT DOCUMENTS 1038745  9/1958  Fed. Rep. of Germany .
2054231  11/1970  Fed. Rep. of Germany .
2021141  12/1970  Fed. Rep. of Germany .
1668510  11/1971  Fed. Rep. of Germany .
2065770  7/1975  Fed. Rep. of Germany .
2515705  10/1976  Fed. Rep. of Germany .
2603259  8/1977  Fed. Rep. of Germany .
2603624  8/1977  Fed. Rep. of Germany .
2626900  8/1977  Fed. Rep. of Germany .
2618809  11/1977  Fed. Rep. of Germany .
2659853  3/1978  Fed. Rep. of Germany .
2851615  6/1980  Fed. Rep. of Germany .
3740774  6/1989  Fed. Rep. of Germany .

*Primary Examiner*—Joseph L. Schofer
*Assistant Examiner*—Wu C. Cheng
*Attorney, Agent, or Firm*—Beveridge, DeGrandi & Weilacher

[57] ABSTRACT

Copolymerizate solutions are disclosed containing copolymerizates based on addition products of an α,β-unsaturated carboxylic acid with a glycidyl ester and copolymerizable α,β-unsaturated monomers with and without hydroxyl groups which are present after the copolymerization with unusually high solid matter content (approximately 78–83% by weight solid matter) and which can be reacted with polyisocyanates to form reaction lacquers with a high solid matter content with good processing viscosity. These lacquers are especially well suited for automobile finishes.

11 Claims, No Drawings

COPOLYMERIZATE SOLUTIONS BASED ON ADDITION PRODUCTS OF α,β-UNSATURATED CARBOXYLIC ACIDS WITH GLYCIDYL ESTERS AND OF α,β-UNSATURATED MONOMERS WHICH CAN BE COPOLYMERIZED WITH THEM

INTRODUCTION TO THE INVENTION

The present invention relates to copolymerizate solutions containing copolymerizates based on addition products of α,β-unsaturated carboxylic acids with glycidyl esters and copolymerizable α,β-unsaturated monomers, which monomers can be with or without hydroxyl groups. The present invention also relates to the preparation of such hydroxy group containing copolymerizates and to their use in clear or pigmented coating compositions.

Copolymerizates containing hydroxyl groups and based on methacrylates and reaction products of acrylic acids and glycidyl esters of α-alkylalkane monocarboxylic acids and/or α,α-dialkylalkane monocarboxylic acids, which can be reacted with organic polyisocyanates to form coating materials, are known. DE-AS 16 68 510 describes copolymerizates from addition products of α,β-ethylenically unsaturated acids with glycidyl esters and copolymerizable α,β-unsaturated monomers with and without hydroxyl groups. DE-PS 26 03 259 indicates reaction lacquers which contain special binders. They are copolymerizates based on styrene, methylmethacrylate, acrylic acid and glycidyl esters of α-alkylalkane monocarboxylic acids and/or α,α-dialkylalkane monocarboxylic acids obtained by heating under simultaneous esterification and polymerization in inert solvents in the presence of polymerization initiators, optionally with chain stoppers.

The special problems with can arise in the preparation of copolymerizate solutions of the type described above have been discussed in detail in DE-PS 28 51 615, column 2, line 66 to column 4, line 12. The following were cited as state of the art: DE-PS 10 38 745, FR 13 90 572, DE-OS 20 54 231, CH 52 39 61, DE-OS 20 21 141, DE-PS 26 26 900, DE-AS 26 03 259, DE-AS 26 59 853, CH 51 95 32, DE-OS 25 15 705, DE-OS 26 03 624, DE-OS 26 18 809, DE-OS 20 65 770 and DE-OS 16 68 510.

The solid matter in the copolymerizate solutions according to the state of the art after conclusion of simultaneous esterification and copolymerization is at most 55% by weight and according to DE-OS 37 40 774, page 4 (component A) approximately 65% by weight, although an especially high solid matter is striven for in the latter.

The present invention has the following objectives:
1. To make available copolymerizate solutions which exhibit a considerably elevated solid matter.
2. To make available methods of preparing the new copolymerizate solutions.
3. The binders obtainable from the new copolymerizate solutions should exhibit an elevated solid matter content with comparable viscosity when used with bi- and/or polyvalent polyisocyanates. This means that the reaction lacquers produced from the copolymerizate solutions and the binder of the invention can be applied in a short time as a coating, e.g. by omitting one or several spraying procedures. Moreover, less organic solvents should be introduced into the environment on account of the greater solid matter in the finished reaction lacquers.
4. The copolymerizate solutions and the binder should result in combination with aliphatic polyisocyanates in the formation of two-component lacquers with high mechanical resistance, resistance to chemicals and weather, which lacquers are rich in solid matter and which dry in the air and in an oven.
5. The making available of copolymerizate solutions and binders and clear or pigmented coatings with elevated solid matter content which result in coatings with a high gloss, good fullness, good flow and improved processing safety which are less damaging to the environment.
6. The copolymerizate solutions and the binders should be able to be processed to form reaction lacquers which are eminently suitable both as first lacquerings on automobile assembly lines and also for auto repair painting.

SUMMARY OF THE INVENTION

The above described and other objects of the present invention are achieved by providing a copolymerizate solution containing 15-50% by weight of one or more inert organic solvents and 50-85% by weight hydroxyl-group-containing copolymerizates. The copolymerizate solution contains a hydroxyl-group-containing copolymerizate based on addition products of α,β-unsaturated acid with glycidyl esters and copolymerizable α,β-unsaturated monomers with and without hydroxyl groups. The copolymerizate solution is characterized in that it comprises a hydroxyl-group-containing copolymerizate which can be obtained from a) 20 to 30% by weight of a glycidyl ester of α-alkylalkane monocarboxylic acids and/or α,α-dialkylalkane monocarboxylic acids, b) 8 to 12% by weight methacrylic acid, c) 15 to 27% by weight hydroxyalkylmethacrylate with 1 to 6 C atoms in the hydroxyalkyl group, d) 30 to 53% by weight styrene, e) 1 to 5% by weight polypropylene glycol monomethacrylate with an average molecular weight of 350 to 387, f) 0 to 20% by weight alkylmethacrylate with 1 to 8 C atoms in the alkyl group;

the sum of the components is 100% by weight in each instance.

DETAILED DESCRIPTION OF THE INVENTION

A special embodiment of the copolymerizate can be obtained from a) 20 to 30% by weight of a glycidyl ester of α-alkylalkane monocarboxylic acids and/or α,α-dialkylalkane monocarboxylic acids, b) 8 to 12% by weight methacrylic acid, c) 15 to 26% by weight hydroxyethylmethacrylate, d) 33 to 52% by weight styrene, e) 1 to 3% by weight polypropylene glycol monomethacrylate with an average molecular weight of 350 to 387, f) 0 to 20% by weight methylmethacrylate;

sum of the components is 100% by weight in each instance.

A preferred embodiment of the copolymerizate can be obtained from a) 20 to 26% by weight of a glycidyl ester of α-alkylalkane monocarboxylic acids and/or α,α-dialkylalkane monocarboxylic acids,
b) 8 to 12% by weight methacrylic acid,
c) 17 to 22% by weight hydroxyethylmethacrylate,
d) 33 to 38% by weight styrene,
e) 1 to 3% by weight polypropylene glycol *monomethacrylate with an average molecular weight of 350 to 387,
f) 8 to 12% by weight methylmethacrylate;
the sum of the components is 100% by weight in each instance.

Another preferred embodiment of the copolymerizate solution can be obtained from
a) 22 to 25% by weight of a glycidyl ester of α-alkylalkane monocarboxylic acids and/or α,α-dialkylalkane monocarboxylic acids,
b) 8 to 12% by weight methacrylic acid,
c) 17 to 21% by weight hydroxyethylmethacrylate,
d) 44 to 48% by weight styrene,
e) 1 to 3% by weight polypropylene glycol monomethacrylate with an average molecular weight of 350 to 387;
the sum of the components is 100% in each instance.

The most preferred embodiment of the above copolymerizate solutions are shown below:
a) 15–25% by weight, preferably 15 to 20% by weight of one or more inert solvents customary in the lacquer industry, preferably with boiling points of 190° C. to 200° C. and
b) 75–85% by weight, preferably 80 to 85% by weight of hydroxyl-group-containing copolymerizates.

It has been determined that the above described copolymerizate solutions when used with bi- and/or polyvalent polyisocyanates results in a solid matter content which is elevated in comparison to the state of the art with comparable viscosity and results in a lower viscosity at the same solid matter content. In addition, the products of the invention exhibit technical lacquer advantages such as improved gloss, fullness, flow, processing safety with a high solid content as well as better environmental properties.

The preparation of the copolymerizate solutions of the invention can be carried out by means of solution polymerization. In this method, the solvents and the glycidyl esters of α-alkylalkane monocarboxylic acids and/or α,α-dialkylalkane monocarboxylic acids are placed into the reaction container, heated to boiling temperature and the mixture or mixtures of monomers, optionally carboxy-epoxy catalysts and initiator(s) are dosed in continuously in approximately 12 to 20 hours. After the end of the introduction of reactants, the mixture is postpolymerized for 2 to 5 hours by being maintained at polymerization temperature until the reaction is essentially complete. The polymerization is carried out at temperatures between 160° C. and 195° C., preferably at 165° C. to 195° C. Conventional reaction vessels can be used for this purpose as will be apparent to those skilled in the art.

In a preferred embodiment which is explained by the examples, a mixture of inert solvents is placed in a receiver and heated under reflux to a boil. The inert solvents are selected in such a manner that they boil under reflux cooling at approximately 195° C. After the start of copolymerization and toward the end of the inflow time, the boiling temperature of the copolymerizate solution drops to approximately 172° C. to 165° C. After the end of the inflow of reactants, the mixture is postpolymerized while still at 160° C. to approximately 172° C. until the reaction is practically complete and the desired solid matter content is present (81.5 to 82.1% solid matter in the examples).

The polymerization reaction is started with known polymerization initiators. Suitable initiators are e.g. peroxides, which decompose thermally into radicals in a reaction of the first order. The type and amount of initiators are selected in such a manner that as constant a supply of radicals as possible is present during the reactant inflow phase.

Initiators for the polymerization which are preferably used are: Dialkylperoxides such as di-tert.-butylperoxide, di-cymylperoxide; hydroperoxides such as cumol hydroperoxide, tert.-butylhydroperoxide; peresters such as tert.-butylperbenzoate, tert.-butyl-per-3,5,5-trimethylhexanoate, tert.-butyl-per-2-ethylhexanoate.

The polymerization initiators, especially tert.-butyl-per-2-ethylhexanoate, are preferably added in an amount of 2 to 6% by weight relative to the originally weighted-in quantity of monomer.

Chain stoppers or chain terminating agents can also be used in order to regulate the molecular weight. Examples are mercaptans, thioglycolic acid esters, chlorinated hydrocarbons, where dodecylmercaptan is preferred.

Inert solvents customary in the lacquer industry can be used individually or preferably in a mixture, with boiling points of 160° C. to 200° C., preferably 190° C. to 200° C. as solvents for the solution polymerization. Organic solvents are preferred which can also be used later in the finished coating materials. Examples of such solvents are: glycol ethers such as ethylene glycol dimethylether; glycol ether esters such as ethylglycol acetate, butylglycol acetate, 3-methoxy-n-butylacetate, butyldiglycol acetate, methoxypropylacetate; esters such as butylacetate, isobutylacetate, amylacetate; and ketones such as methylethylketone, methylisobutylketone, diisobutylketone, cyclohexanone, isophorone, aromatic hydrocarbons such as xylene. "SHELLSOL A ®" and other aromatic hydrocarbon mixtures and aliphatic hydrocarbons can also be used in a blend with the above-named solvents. A mixture of butylglycolacetate, "SHELLSOL A" and ethoxypropylacetate in a weight ratio of 1:2:2 is preferred.

Glycidyl esters of α-alkylalkane monocarboxylic acids and/or α,α-dialkylalkane monocarboxylic acids are used as component a) for the preparation of the hydroxyl-group-containing copolymerizate solutions of the invention. Preferred are those with the empirical formula $C_{13}H_{24}O_3$ either individually or in a mixture, having the following structure:

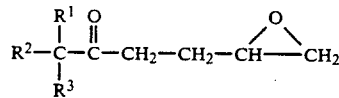

wherein $R^1$, $R^2$ and $R^3$ are straight-chained alkyl groups and at least one of $R^1$, $R^2$ or $R^3$ must be a methyl group.

Since the glycidyl group in the glycidyl ester of such α-alkylalkane monocarboxylic acids and/or α,α-dialkylalkane monocarboxylic acids has the empirical formula $C_3H_5O$, the α-alkylalkane monocarboxylic acids and α,α-dialkylalkane monocarboxylic acids are isomeric mixtures of such monocarboxylic acids which contain a $C_{10}$ chain. The acids are preferably completely saturated and very heavily substituted on the α carbon atom (carbon atom in α position); examples for this are described in "Deutsche Farbenzeitschrift" ("German Paint Journal"), volume 10/16, page 435, which is incorporated herein by reference.

Suitable hydroxyalkylmethacrylates with 1 to 6 C atoms in the hydroxyalkyl group are hydroxy methacrylate, 2-hydroxyethylmethacrylate, 2-hydroxypropylmethacrylate, 4-butanediol monomethacrylate, 5-pentanediol monomethacrylate, cyclohexanediol monomethacrylate and 4-dihydroxymethylcyclohexane monomethacrylate individually or in a mixture; 2-hydroxyethylmethacrylate is preferably used.

The carboxy-epoxy catalysts are based on an alkali-metal compound. The carboxy-epoxy catalysts which can be used are all sodium, lithium, potassium, rubidium and cesium compounds, individually or in a mixture, which are soluble in the reaction mixture of methacrylic acid, monoglycidyl compound and vinyl compounds, and go into solution at least upon the addition and/or upon the maintenance of the reaction batch at reaction temperature for the purpose of esterification by addition with simultaneous copolymerization. However, the alkali compound used as catalyst should be free of such components which could have a disadvantageous effect in the copolymerization of the addition product, which produces an ester.

For example, the carbonates, bicarbonates, formates, iodides, bromides, fluorides and the hydroxides of the above-named alkali metals can be used. On an industrial scale, lithium hydroxide and potassium hydroxide, either individually or in a mixture, have proven to be the best.

When carrying out the invention on an industrial scale, potassium hydroxide is used here with particular advantage on account of its low price and its excellent catalytic properties. The alkali hydroxide or the alkali compound or its mixtures used are advantageously dissolved in the methacrylic acid to be esterified. However, one can also use the alkali compound, e.g. alkali hydroxides, alkali carbonates or alkali bicarbonates and first react the methacrylic acid to form the corresponding alkali salt as catalyst. Then the alkali salt of the methacrylic acid can be dissolved in the reaction mixture or brought into solution during the carrying out of the addition reaction by means of heating.

It is generally sufficient to add approximately 0.005% by weight to approximately 0.5% by weight alkali-metal compound of the previously mentioned type relative to the weight of the ester-forming component(s) for the addition reaction. However, an addition of approximately 0.01% by weight to approximately 0.3% by weight alkali-metal compound is preferred.

The most preferable range for the addition is approximately 0.02% by weight to 0.1% by weight alkali-metal compounds; among the alkali-metal compounds, potassium compounds and lithium compounds are used with special advantage.

Special tests have shown that when an alkali-carboxy epoxy catalyst, preferably alkali-hydroxide, -carbonate and -bicarbonate is used in the preparation of the copolymerizate solution, special effects which were not to be expected occur in the coating materials obtainable therefrom with polyisocyanates. Thus, such reaction lacquers exhibit a longer pot life and the coatings produced from them exhibit a better ageing behavior as regards the elasticity degradation.

The copolymerizate solutions of the invention can be processed to produce clear or pigmented coating compositions. For this, they are compounded in solvents with optional additives and auxiliary agents conventional for use in lacquers with customary lacquer polyisocyanates. For this, preferably 60 to 80% by weight of the hydroxyl-group-containing copolymerizate B is compounded with 20 to 40% by weight bi- and/or polyvalent polyisocyanate as component C; the sum of components B and C is 100% in each instance. A surface can have such coating compositions sprayed, brushed or otherwise deposited thereon. The coating composition of the present invention are especially well suited for automobile finishes on new vehicles or in the vehicle repair field.

The polyisocyanates C which can be used for the cross-linking of copolymerizate B of the invention are polyisocyanates typical for lacquers.

The amount of polyisocyanate cross-linking agent is selected so that for one hydroxyl group of the binder mixture, 0.5 to 1.5 isocyanate groups are provided. Excess isocyanate groups can react due to moisture and contribute to the cross linking.

Aliphatic, cycloaliphatic and aromatic polyisocyanates such as hexamethylene diisocyanate, trimethyl-hexamethylene diisocyanate, isophorone diisocyanate, 4,4'-diisocyanatodicyclohexylmethane, toluene-2,4-diisocyanate, o-, m- and p-xylylene diisocyanate, 4,4'diisocyanatodiphenyl methane; blocked polyisocyanates such as polyisocyanates blocked with CH—, NH— or OH acid compounds; as well as e.g. polyisocyanates containing biuret-, allophanate-, urethane- or isocyanurate groups can be used. Examples for such polyisocyanates are a reaction product containing biuret groups and consisting of 3 moles hexamethylene diisocyanate with 1 mole water with an NCO content of approximately 22% (corresponding to the commercial product "DESMODUR N" BAYER AG); a polyisocyanate containing isocyanate groups which is prepared by means of the trimerization of 3 moles hexamethylene diisocyanate and with an NCO content of approximately 21.5% (corresponding to the commercial product "DESMODUR N 3390" BAYER AG) or polyisocyanates containing urethane groups which polyisocyanates represent reaction products of 3 moles toluylene diisocyanate and 1 mole trimethylol propane with an NCO content of approximately 17.5% (corresponding to the commercial product "DESMODUR L" BAYER AG).

"DESMODUR N" and "DESMODUR N 3390", BAYER AG, are preferred.

As mentioned above, transparent or pigmented coating compositions are produced from components B and C. Transparent coating compositions are used e.g. as lacquers in a 2-coat lacquer composed of a base layer containing pigments and of a transparent cover layer applied in a wet-on-wet method and subsequently hardened either in air or in ovens. In addition to conventional solvents for adjusting the spraying viscosity, these lacquers optionally contain conventional flow agents and light stabilizers as well as other additives conventional in lacquer technology. The compounding and formulation of such conventional additives for lacquers are understood by those skilled in the art.

In order to produce pigmented coating materials, the individual components are mixed with each other and homogenized and/or ground in a customary manner. It is possible to proceed, for example, by first mixing a part of the copolymerizate solution with optionally present pigments and auxiliary agents and solvents conventional in the lacquer industry and grinding the mixture in grinding equipment.

Then, the ground material is compounded with the residual copolymerizate solution.

The coating compositions obtained from the copolymerizate solution containing hydroxyl groups in accordance with the invention have the great advantage of a high solid matter content with relatively low viscosity. The flow properties of these compositions are excellent and they result in coatings with excellent gloss and superb fullness. The coating compositions according to the invention can dry in a very short time and automobile parts painted therewith can be rapidly assembled. Rapid drying properties of the coatings of the invention also enable multiple lacquering operations. This means, for example, if the main color of the car is white and the owner desires decorative black stripping, the white surface can be protected by adhesive tape and the black lacquer of the invention can be sprayed on otherwise applied onto the car in the desired pattern. The black decoration will rapidly dry and thereafter a protective clear lacquer according to the invention can be applied. After rapidly drying the adhesive tape is stripped off leaving the desired pattern of decoration. The coating compositions obtainable from the copolymerizate solutions of the invention are therefore suitable in the motor vehicle industry in particular for the painting of motor vehicle bodies but are also suitable in the repair sector for the rapid repairing of e.g. damages due to accidents.

A metal sheet of a car may be coated with the coating agent. For rapid repairing after damages, all layers on the sheet must be removed (e.g., by mechanical means) until the surface of the shining metal sheet is reached. The metal sheet is then optionally coated with (1) a primer coating, (2) a filler coating, (3) pigmented lacquer of the present invention, and (4) clear or transparent lacquer of the present invention.

The coating agent may also be used on a plastic part. The plastic part is coated with (1) a coupling agent coating and (2) transparent and/or pigmented lacquer of the present invention.

The following examples serve to explain the invention.

EXAMPLES

Preparation of the Copolymerizate Solution

Component I is placed in a 4 liter three-neck flask equipped with an agitator device, contact thermometer, ball condenser and 2 drop funnels in accordance with the indications of amounts in the following table and is heated under agitation to 194° C. with reflux cooling engaged.

Within 16 hours, component II (monomeric mixture and KOH as carboxy-epoxy catalyst and chain-transfer agent) and component III (solvent-initiator mixture) are dosed in continuously from drop funnels 1 and 2. The temperature drops from 194° C. toward the end of the inflow time to 171° to 165° C. After the end of the inflow, the mixture is postpolymerized subsequently for 3 hours at 160° to 172° C., so that the reaction is practically complete.

TABLE

| (originally weighed-in quantity in grams) | | | |
|---|---|---|---|
| Component | copoly-merizate 1 | copoly-merizate 2 | copoly-merizate 3 |
| I butyl glycolate | 100 | 100 | 100 |
| ethoxypropylacetate | 160 | 160 | 160 |
| mixture of aromatic hydrocarbons ("SHELLSOL A", | 200 | 200 | 200 |
| glycidyl ester ("CARDURA E 10", | 480 | 480 | 480 |
| II methacrylic acid | 210 | 200 | 210 |
| 2-hydroxyethylmethacrylate | 386 | 386 | 386 |
| styrene | 704 | 914 | 704 |
| polypropylene glycol monomethacrylate* | 20 | 20 | 20 |
| methylmethacrylate | 200 | — | 200 |
| potassium hydroxide | 0.1 | 0.2 | 0.1 |
| dodecylmercaptan | 10 | 10 | 10 |
| III ethoxypropylacetate | 40 | 40 | 40 |
| tert.-butyl-per-2-ethylhexanoate | 80 | 80 | 80 |
| Characteristic data: | | | |
| Solid matter (%) | 81.5 | 82.1 | 81.5 |
| Viscosity DIN-4 beaker after dilution with butylacetate to 60% solid matter | 56 sec. | 74 sec. | 56 sec. |
| Acid value: (rel. to solid resin): | 17.5 | 14.7 | 17.5 |
| OH value (rel. to solid resin): | 147 | 146 | 147 |

*average molecular weight from 350 to 387

Orienting tests have shown that the preparation of the copolymerizate solution is also possible in the absence of carboxy-epoxy catalysts under the indicated conditions.

Preparation of a Lacquer from Copolymerizate Solution 1

1200 g butylacetate, 850 g xylene, 1050 g of a mixture of aromatic hydrocarbons ("SHELLSOL A"), 150 g light stabilizer (Tinuvin 1130), 100 g light stabilizer (Tinuvin 292), 50 g of 5% dibutyl tin dilaurate solution in xylene as accelerator, and 200 g flow-control agent (Byk 300 10% in xylene) are thoroughly mixed in a clean, dry container. Then, 6400 g copolymerizate solution 1 (previously adjusted from 81.5% by weight solid matter by means of the addition of butylglycol acetate/ethoxypropylacetate/"SHELLSOL". A mixture in a weight ratio of 1:2:2 to 80% by weight solid matter are added and thoroughly mixed. Then, 300 g lacquer polyisocyanate/"DESMODUR N 3390" 80% dissolved in xylene/butylacetate mixture 1:1 are added to the batch and thoroughly mixed and the viscosity immediately determined in a DIN D-4 beaker. The mixture is adjusted by means of dilution with a "SHELLSOL A"/butylacetate mixture 1:1 to the spray viscosity of 21 seconds discharge time.

The solid matter of the above clear lacquer is 57.1% by weight. This signifies a distinct improvement over the state of the art of only 50.2% by weight solid matter. Further tests of the clear lacquer (varnish) showed that it exhibits improved properties of use. The lacquer applied onto test plates yielded a pendulum hardness of 116 seconds after having dried off 45 minutes heated to 80° C. and yielded a pendulum hardness of 190 seconds after having dried off 30 minutes heated to 130° C.

Preparation of a White Lacquer from Copolymerizate Solution 1

620 g "SHELLSOL A", 150 g sedimentation inhibitor consisting of 15 g Bentone 38, 129 g xylene and 6 g Anti-Terra U, 50 g dibutyl tin dilaurate 1% by weight in xylene, 2200 g copolymerizate solution 1 (diluted to 80% by weight solid matter, as already indicated above) and 375 g wetting agent (Byk 160 30%) are well mixed in a clean, dry container and 2900 g white pigment titanium dioxide 2160 are gradually added under agitation and the mixture placed in a bead mill. The mixture is ground 30 minutes with a bead ratio of 1:1. Thereafter, the batch is adjusted with 1650 g copolymerizate solution 1 to 80% by weight solid matter, 200 g flow-control agent (Byk 344 10% by weight in xylene), 300 g ventilation agent (Byketol OK) and 760 g n-butylacetate added and the mixture well mixed. 1800 g dilution Bd 1316 (see below) are added to this batch as solvent, and then 1800 g lacquer polyisocyanate "DESMODUR N 3390" 90% are added under vigorous agitation. The solid matter of the above white lacquer is 65.9% by weight. This fact shows that the lacquers which contain the copolymerizate solution of the invention can be applied in a shorter time as coating (e.g. omission of spraying steps) and that the coating produced nevertheless exhibits full properties of use and that fewer organic solvents are emitted into the environment as a result of the shortening of the spraying process. The above-mentioned dilution Bd 1316 is obtained by mixing 2500 g ethoxypropylacetate, 2500 g n-butylacetate, 500 g butoxyl (=3-methoxy-1-butylactate), 2500 g xylene and 200 g "SHELLSOL A".

The pot life of the above white lacquer was, measured as outflow time in a DIN D-4 beaker:

| measured immediately after preparation | 21 seconds |
| --- | --- |
| after 2 hours | 25 seconds |
| after 4 hours | 32 seconds |
| after 6 hours | 43 seconds |
| after 8 hours | 65 seconds |

Steel plates coated with commercially available filler were coated over after one day with the above white lacquer and hardened 60 minutes at 80° C. The properties were measured after 24 hours:

| Filler | 34-39 μm |
| --- | --- |
| Lacquer | 52-60 μm |
| Gloss 60° | 96% measured according to DIN 67530 and ISO 2813 |
| Pendulum hardness according to Koenig | 118" measured according to DIN 53157 or ISO 1522 |
| Buchholz hardness | 95" measured according to DIN 53153 or ISO 2815 |
| Cupping index | 8.1 mm measured according to DIN 53156 or ISO 1520 |
| Adhesion "cross-cut adhesion test" | Gt 0 measured according to DIN 5351 or ISO 2409 |
| Resistance test | 5' xylene i.o<br>5' super non-leaded i.o |

Resistance Tests with Xylene and Non-leaded Premium Grade Gasoline

The baked film of the white lacquer was covered with a cotton plug soaked with xylene or non-leaded premium grade gasoline for 5 minutes in an uncovered state. After the removal of the cotton plug and wiping to remove the test liquid, the dry, treated film was evaluated. No changes in film should be present when given the measured observation "in order".

Evaluation of the Above Test Results

In spite of the high solid matter content of the test lacquer, the measured values show that the gloss, the pendulum hardness according to Koenig, the Buchholz hardness, the cupping index, the cross-cut test and the resistance tests resulted in values which correspond to those of very good commercial products which nevertheless have the disadvantage that the lacquers exhibit a lower solid matter content. Every expert in the art knows that it is very difficult, given a rising solid matter content in lacquers, to achieve the required high quality features at all, so that the test results exhibit surprising properties.

Production of a Lacquer from Copolymerizate Solution 2

1200 g butylacetate, 850 g xylene, 1050 g of a mixture of aromatic hydrocarbons ("SHELLSOL A"), 150 g light stabilizer (Tinuvin 1130), 100 g light stabilizer (Tinuvin 292), 100 g 5% dibutyl tin dilaurate solution in xylene as accelerator and 200 g flow-control agent (Byk 300 10% in xylene) are thoroughly mixed in a clean, dry container. Then, 6400 g copolymerizate solution 2 (previously adjusted from 82.1% by weight solid matter by means of the addition of butylglycol acetate/ethoxypropylacetate/"SHELLSOL A" mixture in a weight ratio of 1:2:2 to 80% by weight solid matter) are added and thoroughly mixed. Then, 300 g lacquer polyisocyanate/"DESMODUR N 3390" 80% dissolved in xylene/butylacetate mixture 1:1 are added to the batch and thoroughly mixed and the viscosity immediately determined in a DIN D-4 beaker. The mixture is adjusted by means of dilution with a "SHELLSOL A"/butylacetate mixture 1:1 to the spray viscosity of 21 seconds discharge time.

The solid matter of the above lacquer is 57.1% by weight. This signifies a distinct improvement over the state of the art of only 50.2% by weight solid matter. Further tests of the lacquer showed that it exhibits improved properties of use.

Preparation of a White Lacquer from Copolymerizate Solution 2

620 g "SHELLSOL A", 150 g sedimentation inhibitor consisting of 15 g Bentone 38, 129 g xylene and 6 g Anti-Terra U, 50 g dibutyl tin dilaurate 1% by weight in xylene, 2200 g copolymerizate solution 2 (diluted to 80% by weight solid matter, as already indicated above) and 375 g wetting agent (Byk 160 30%) are well mixed in a clean, dry container and 2900 g white pigment titanium dioxide 2160 are gradually added under agitation and the mixture placed in a bead mill. The mixture is ground 30 minutes with a bead ratio of 1:1. Thereafter, the batch is adjusted with 1650 g copolymerizate solution 2 to 80% by weight solid matter, 200 g flow-control agent (Byk 344 10% by weight in xylene), 300 g ventilation agent (Byketol OK) and 760 g n-butylacetate added and the mixture well mixed. 1800 g dilution Bd 1316 are added to this batch as solvent and then 1800 g lacquer polyisocyanate "DESMODUR N 3390" 90% are added under vigorous agitation. The solid matter of the above white lacquer is 64.4% by weight. This fact shows that the lacquers which contain the copolymerizate solution of the invention can be applied in a shorter time as coating (e.g. omission of spraying steps) and that the coating produced nevertheless exhibits full properties of use and that fewer organic solvents are emitted into the environment as a result of the shortening of the spraying process.

The pot life of the above white lacquer was, measured as outflow time in a DIN D-4 beaker:

| measured immediately after preparation | 21 seconds |
|---|---|
| after 2 hours | 24.5 seconds |
| after 4 hours | 30 seconds |
| after 6 hours | 42 seconds |
| after 8 hours | 56 seconds |

Steel plates coated with commercially available filler were coated over after one day with the above white lacquer and hardened 60 minutes at 80° C. The properties were measured after 24 hours:

| Filler | 33–38 μm |
|---|---|
| Lacquer | 50–65 μm |
| Gloss 60° | 95% measured according to DIN 67530 and ISO 2813 |
| Pendulum hardness according to Koenig | 111″ measured according to DIN 53157 or ISO 1522 |
| Buchholz hardness | 95″ measured according to DIN 53153 or ISO 2815 |
| Cupping index | 8.4 mm measured according to DIN 53156 or ISO 1520 |
| Adhesion "cross-cut adhesion test" | Gt 0–1 measured according to DIN 5351 or ISO 2409 |
| Resistance test | 5′ xylene i.o 5′ super non-leaded i.o |

The above test results likewise show the surprising properties for the films produced from the white lacquer based on copolymerizate solution 2, as has already been demonstrated in detail above for the films of the white lacquer based on copolymerizate solution 1.

The description, examples, the lacquers and the experimentally determined data show that the initially cited objectives of the invention have actually been achieved.

Commercial products were named in the preparation of the copolymerizate solutions and lacquers which are explained here in more detail:

"SHELLSOL A" has an initial boiling point of 166° C. and an aromatics content of 98% by volume.

Tinuvin 1130 is a liquid UV absorber based on a hydroxyphenylbenzotriazol derivative. It is the reaction product of the following 2 components, which has an average molecular weight of Mw > 600.

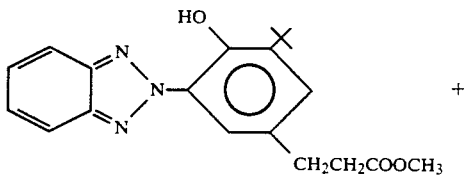

methyl-3-(3-(2H-benzotriazol 2-yl)-5-tert.butyl-4-hydroxyphenyl)propionate $HO(CH_2CH_2O)_nH$
n = 6, 7 polyethylene glycol 300

Tinuvin 1130

Tinuvin 292 is a liquid light stabilizer. Tinuvin 292 was developed chemically for the light stabilization of industrial lacquers. Tinuvin 292 belongs to the class of sterically hindered amines (HALS). It has the advantage of not being sensitive to acid-catalyzed systems which are used as low-baked auto repair paints.

BYK-300 is an additive for increasing the resistance to scratching and scraping and is based on a 50% solution of a special, lacquer-comparable polysiloxane copolymer. The producer is BYK-Chemie GmbH, D-4230 Wesel, Germany.

BENTONE 38 is a special, organically modified smektite and an extremely effective rheologic additive. Bentone 38 is used in particular in non-polar to moderately polar organic systems in which it develops its full effectiveness. The producer is the Kronos-Titan GmbH, D-5090 Leverkusen 1, Germany.

ANTI-TERRA-U is a wetting and dispersing additive for a better pigment wetting which is present as a salt of unsaturated polyamine amides and higher-molecular acidic esters. The producer is the BYK-Chemie GmbH, D-4230 Wesel, Germany.

DISPERBYK-160 is a wetting and dispersing additive for organic pigments. It is a higher-molecular copolymer with functional pigment affinity groupings.

| Density at 20° C. | (DIN 51757) 0.94–0.96 g/cm³ |
|---|---|
| Amine value | 10–12 mg KOH/g |
| Flash point | (DIN/ISO 3679) 24–26° C. |
| Non-volatile components | (ASTM D 1644 B) approx. 30% |
| Solvent | xylene/butylacetate 6/1 |
| Appearance | clear to slightly cloudy, faintly yellow liquid |
| Producer: | BYK-Chemie GmbH |

KRONOS 2160 is a rutile pigment produced according to the chloride method. It is surface-treated with aluminum-silicon compounds and with organic substances.

| TiO₂ content | 91% |
|---|---|
| Density | 3.9 g/cm³ |
| Relative scattering power* | 105% |

*The relative scattering power is determined according to DIN 53165 at a PVK of 17%. The reference pigment is KRONOS 2056.

According to DIN 55912, part 1 and the norm ISO 591, this Kronos titanium dioxide pigment belongs in the group R 2. The producer is the Kronos-Titan-BmbH, D-5090 Leverkusen, Germany.

BYK-344 is an additive for increasing the resistance to scratching and scraping which is a 50% solution of a special, modified, lacquer-compatible siloxane copolymer.

| Density at 20° C. | (DIN 51757) 0.93–0.95 g/cm³ |
|---|---|
| Refraction number | (DIN 53491) 1.463–1.468 |
| Non-volatile components | (ASTM D1644B) 48–50% |
| Solvent | xylene/isobutanol: 4/1 |

| | |
|---|---|
| Flash point | (DIN/ISO 3679) 23° C. |
| Appearance | clear to slightly cloudy liquid |
| Producer: | BYK-Chemie GmbH |

BYKETOL-OK is a flow additive built up on the base of a mixture of high-boiling aromatics, ketones and esters.

| | |
|---|---|
| Density at 20° C. | (DIN 51757) 0.86–0.87 g/cm$^3$ |
| Refraction number | (DIN 53491) 1.468–1.474 |
| Flash point | (DIN/ISO 3679) 42° C. |
| Appearance | clear to slightly cloudy liquid |
| Producer: | BYK-Chemie |

"CARDURA E10" is the glycidyl ester of "VERSATIC 10", a synthetic saturated monocarboxylic acid of highly branched structure containing ten carbon atoms. Its structure may be represented as:

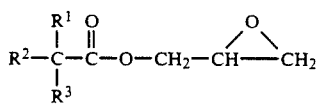

where $R^1$, $R^2$ and $R^3$ are straight chain alkyl groups of which at least one is always methyl.

Further variations and modifications of the invention will become apparent to those skilled in the art from the foregoing and are intended to be encompassed by the claims appended hereto.

German Priority Application P 40 01 579.3 is relied on and incorporated by reference.

What is claimed:

1. A copolymerizate solution comprising inert organic solvents and a copolymerizate based on an addition product of an $\alpha,\beta$-unsaturated acid with a glycidyl ester and copolymerizable $\alpha,\beta$-unsaturated monomers with or without hydroxyl groups, wherein said copolymerizate solution comprises the components:
   A) 15–50% by weight of inert organic solvent,
   B) 50–85% by weight of a hydroxyl-group-containing copolymerizate wherein said copolymerizate is obtained by means of simultaneous addition esterification and polymerization in an inert organic solvent or mixtures thereof which exhibit a boiling range between 160° C. to 200° C. and by heating under reflux cooling in the presence of a polymerization initiator, of
   a) 20 to 30% by weight glycidyl ester of $\alpha$-alkylalkane monocarboxylic acids and/or $\alpha,\alpha$-dialkylalkane monocarboxylic acids,
   b) 8 to 12% by weight methacrylic acid,
   c) 15 to 27% by weight hydroxyalkylmethacrylate with 1 to 6 C atoms in the hydroxyalkyl group,
   d) 30 to 53% by weight styrene,
   e) 1 to 5% by weight polypropylene glycol monomethacrylate with an average molecular weight of 350 to 387, and
   f) 0 to 20% by weight alkylmethacrylate with 1 to 8 C atoms in the alkyl group;
   the sum of the components is 100% by weight in each instance; wherein components c) and e) are different.

2. The copolymerizate solution according to claim 1, wherein said copolymerizate is obtained by means of a chain-transfer agent.

3. The copolymerizate solution according to claim 1, wherein said copolymerizate is obtained by means of a carboxy-epoxy catalyst.

4. The copolymerizate solution according to claim 1, wherein said hydroxyalkylmethacrylate is hydroxyethylmethacrylate and is present at 15 to 26% by weight, said styrene is present at 33–52% by weight, said polypropylene glycol monomethacrylate is present at 1 to 3% by weight, and said alkylmethacrylate is methylmethacrylate and is present at 0 to 20% by weight.

5. The copolymerizate solution according to claim 4, wherein said glycidyl ester of $\alpha$-alkylalkane monocarboxylic acids and/or $\alpha,\alpha$-dialkylalkane monocarboxylic acids is present at 20 to 26% by weight, said hydroxyalkylmethacrylate is hydroxyethylmethacrylate and is present at 17 to 22% by weight, said styrene is present at 33 to 38% by weight, said polypropylene glycol monomethacrylate is present at 1 to 3% by weight, and said alkylmethacrylate is methylmethacrylate and is present at 8 to 12% by weight.

6. The copolymerizate solution according to claim 1, wherein said glycidyl ester of $\alpha$-alkylalkane monocarboxylic acids and/or $\alpha,\alpha$-dialkylalkane monocarboxylic acids is present at 22 to 25% by weight, said hydroxyalkylmethacrylate is hydroxyethylmethacrylate and is present at 17 to 21% by weight, said styrene is present at 44 to 48% by weight, said polypropylene glycol monomethacrylate is present at 1 to 3% by weight.

7. The copolymerizate solution according to claim 1, wherein said copolymerizate solution comprises:
   A) 15–25% by weight of said inert solvent and
   B) 75–85% by weight of said hydroxyl-group-containing copolymerizate.

8. The copolymerizate solution according to claim 7, wherein said inert solvent is present at 15 to 20% by weight.

9. The copolymerizate solution according to claim 7, wherein said hydroxyl-group-containing copolymerizate is present at 80–85% by weight.

10. The copolymerizate solution according to claim 1, wherein said inert solvent has a boiling point of 190°–200° C.

11. The copolymerizate solution according to claim 1, wherein said hydroxyalkylmethacrylate is at least one member of the group consisting of hydroxy methacrylate, 2-hydroxyethylmethacrylate, 2-hydroxypropylemthacrylate, 4-butanedio monomethacrylate, 5-pentanediol monomethacrylate, cyclohexanediol monomethacrylate, 4-dihydroxymethylcyclohexane monomethacrylate, and mixtures thereof.

* * * * *